D. F. Carr,
Cultivator.
No 91,084. Patented June 8. 1869.

Witnesses:
A. Connolly
L. D. Bishop.

Inventor:
D. F. Carr
by
Thos A Connolly
Atty.

United States Patent Office.

DAVID F. CARR, OF EAST UNION TOWNSHIP, OHIO.

Letters Patent No. 91,084, dated June 8, 1869.

IMPROVEMENT IN CULTIVATORS.

The Schedule referred to in these Letters Patent and making part of the same.

*To all whom it may concern:*

Be it known that I, DAVID F. CARR, of East Union township, in the county of Wayne, and State of Ohio, have invented certain new and useful Improvements in Cultivators; and I do hereby declare the following to be a full, clear, and exact description thereof, reference being had to the accompanying drawings, forming part of this specification, in which—

Figure 1:
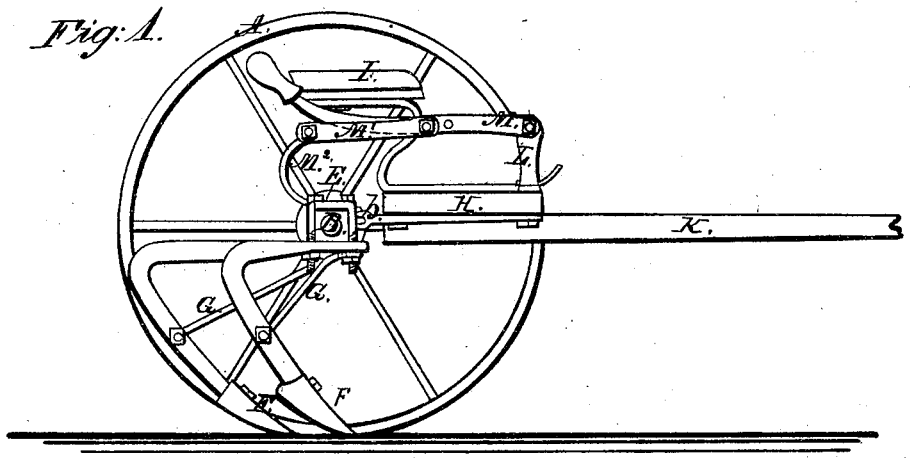
Figure 1 is a side elevation.

These improvements relate to a two-wheeled cultivator, having a number of beams provided with shovels, connected with the axle of the main wheels by loops and nuts, and braced, as hereafter to be shown; also having a linked lever, by operating which the cultivator-shovels are raised simultaneously from the soil.

A are the wheels, and

B, the axle, square in form.

C are the shovel-beams, the upper ends of which rest against the under side of the axle, and are rigidly connected with the latter by means of the loops E, which pass around the axle, thence through holes in the beams, and are secured, by nuts on their screw-ends, on the lower sides of the beams, as clearly seen in the drawings.

The beams C, extending back from the axle, are curved to a slight forward incline, and have suitable shovels F, attached by bolts or otherwise to their lower ends.

The beams are of different alternate lengths, so that the plows of the longer beams are back a short distance from the line of the shovels on the shorter beams.

G are the braces to strengthen the beams C, to which they are attached by their rear ends passing through holes therein, and a nut screwed on. Extending diagonally upward, the braces are looped to the forward ends of the loops E, the nut being placed thereon after the brace-end.

H is a rectangular or other suitably-formed frame, hinged to the axle B by the hinges $b\ b$, and provided with a driver's seat, I, and tongue, K.

L is a standard inserted in the forward part of the frame H, to which is pivoted a lever, M, curving back and up beside the driver's seat, and furnished with a suitable handle.

$M^1$ is a link, pivoted at one end to the lever M, and at the other end to the bent arm $M^2$, which is bolted to the upper side of the axle B, and thence curved back and up, as shown in fig. 1, so that when the lever M is lifted, the axle will turn within the wheels, thus raising the shovels F as far as desired from the soil.

In order to regulate the raising of the shovels, the lever is furnished with several holes for the bolt which connects it with the link $M^1$, so that the height to which the shovels are raised is governed by the position of the bolt.

The lever, it will be seen, when upright is self-locking, hence the use of the adjustable link $M^1$.

Figure 2:
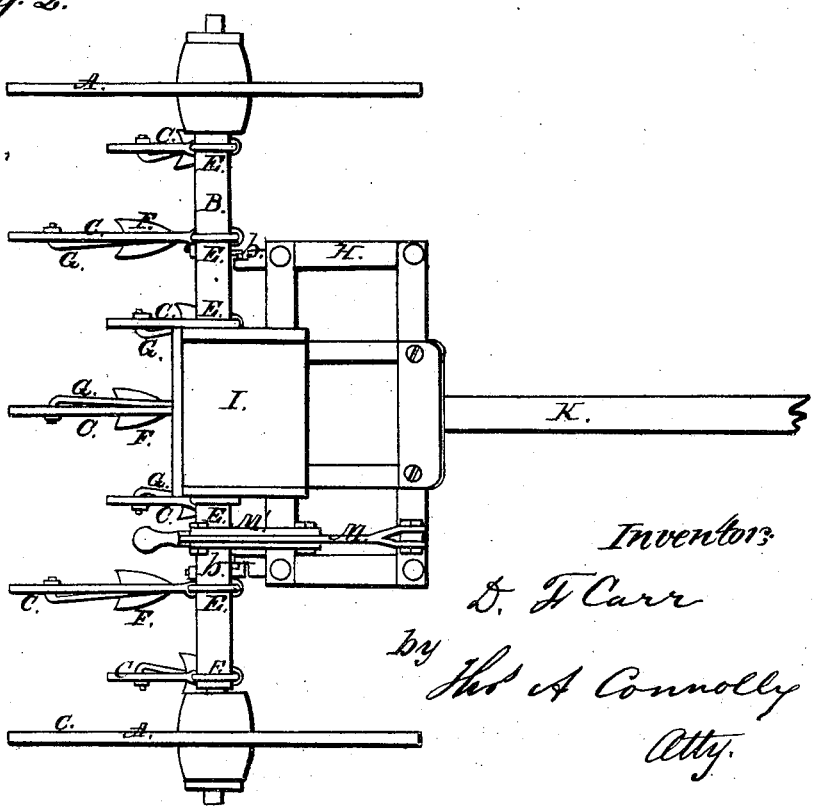
Figure 2 is a plan.

In fig. 2, of the drawings, a cultivator as herein described is shown, provided with seven beams and shovels. It may be drawn by two horses; by turning the cultivator at the end of the cultivated rows, the same ground may be twice gone over.

This cultivator may be adjusted from a field-cultivator to a cotton, corn, or potato-cultivator, by removing the centre-beam from the axle, and, if desirable, by substituting regular shovel-plows for the shovels of the remaining middle two beams; and shovel-plows may also be used instead of the cultivator-plows shown, whenever necessary, the manner in which the shovels are connected with the beams rendering their removal easy; by removing all but two beams from the axle, and placing these two at a suitable distance apart, the machine may be used in marking or spacing corn or cotton-lands.

What I claim as my invention, and desire to secure by Letters Patent, is—

1. The combination, with the axle B of the beams C, loops E, braces G, and shovels F, when adjusted and arranged substantially as and for the purpose specified.

2. The lever M and link $M^1$, in combination with the axle B and parts above claimed, as and for the purpose set forth.

D. F. CARR.

Witnesses:
THOS. A. CONNOLLY,
A. S. CONNOLLY.